W. McARTHUR, Jr.
TUBULAR LANTERN.
APPLICATION FILED SEPT. 7, 1912.
1,070,155.  Patented Aug. 12, 1913.
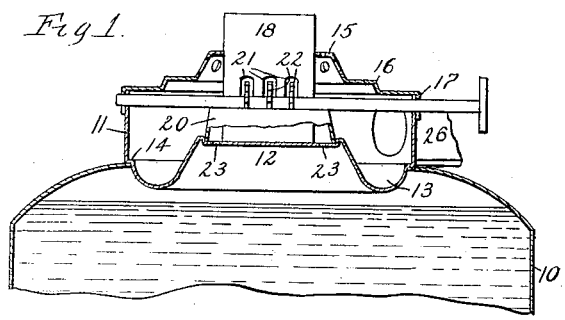
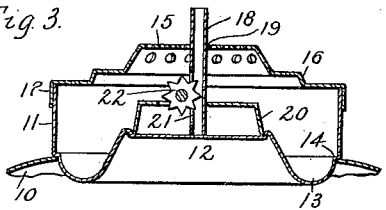
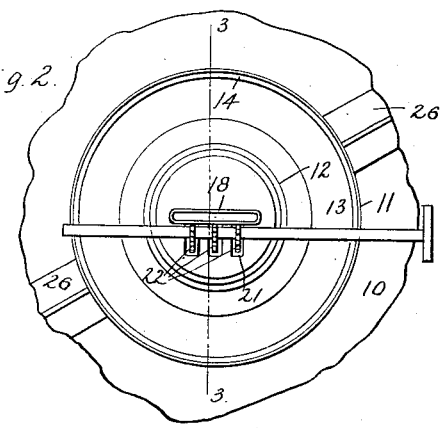
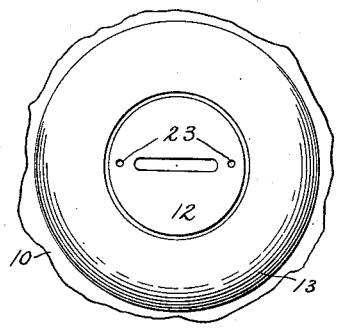
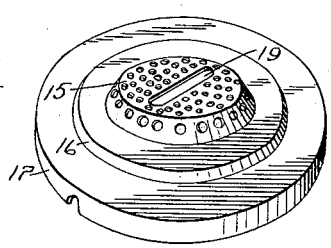
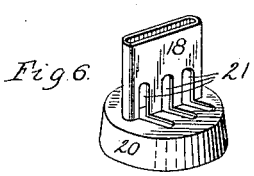
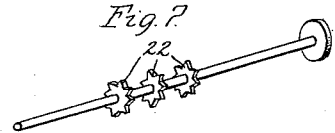
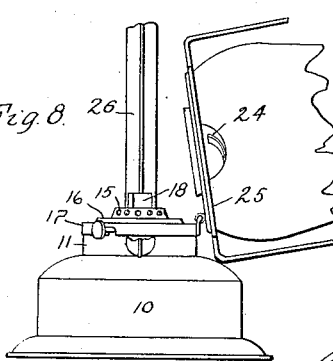
Witnesses:—
Inventor
Attorneys.

UNITED STATES PATENT OFFICE.

WARREN McARTHUR, JR., OF CHICAGO, ILLINOIS.

TUBULAR LANTERN.

1,070,155.  Specification of Letters Patent.  Patented Aug. 12, 1913.

Application filed September 7, 1912. Serial No. 719,199.

*To all whom it may concern:*

Be it known that I, WARREN MCARTHUR, Jr., a citizen of the United States, residing at Chicago, in the county of Cook and State of Illinois, have invented a new and useful Improvement in Tubular Lanterns, of which the following is a specification.

This invention relates to that class of burner structures in tubular lanterns in which the wick tube and the burner cone are separable, as, for instance, by attaching the cone to a movable globe plate.

Heretofore the wick tube has usually been secured within a burner body and the latter has been removably seated in a socket in the top of the oil pot, so that upon removing the globe plate and the cone the burner body containing the wick tube could be removed from the burner socket for inserting a new wick, or for other purposes. As the burners in tubular lanterns are slip burners, not secured by screw-threads but simply slipped into the socket, which style of burner must be used in order to place the wick-raiser shaft in the proper position, it has been customary to provide the burner with some fastening device in order to prevent as far as possible the accidental detachment of the burner from its socket, but these fastenings are usually troublesome and often render it difficult to seat the burner properly, especially in the hands of unskillful persons.

The object of this invention is to secure the wick tube permanently to the oil pot, leaving only the cone removable, thereby simplifying the burner structure, rendering the same strong and durable and avoiding all danger of the burner becoming accidentally detached from the oil pot.

In the accompanying drawings: Figure 1 is a sectional elevation of this improved burner. Fig. 2 is a top plan view of the burner with the top plate of the air chamber removed. Fig. 3 is a vertical section on line 3—3, Fig. 2. Fig. 4 is a bottom plan view of the burner. Fig. 5 is a perspective view of the top plate of the air chamber. Fig. 6 is a perspective view of the wick tube and the drip chamber at the base thereof. Fig. 7 is a perspective view of the wick-raiser. Fig. 8 is a side elevation of the lower portion of a tubular lantern provided with this improved burner.

Like reference characters refer to like parts in the several figures.

10 represents the oil pot having its top portion provided with a central opening for the reception of the air chamber. The latter is preferably composed of a body and a top plate, each stamped in one piece of tin or other sheet metal. The body of the air chamber comprises an upright cylindrical wall 11 and a bottom which is seated in the opening of the oil pot and which is composed of a raised central portion 12, a depressed annular portion 13 surrounding said raised portion and depending into the oil pot, and a marginal portion 14 which rests upon the oil pot and from which the cylindrical wall 11 extends upwardly. The depressed annular portion fits into the opening in the top plate of the oil pot and centers the air chamber on the same. The top plate of the air chamber has a perforated raised central portion 15, a surrounding shoulder or seat 16 for the burner cone, and a marginal flange 17 which holds the top plate on the air chamber.

18 represents the wick tube which projects through a slot 19 in the top plate and is arranged with its lower end in a slot in the raised portion of the bottom of the air chamber. The lower portion of the wick tube is surrounded by a cap 20 which rests on the raised portion 12 of the bottom of the air chamber and forms a drip cup or chamber which receives any oil which may escape through the slots 21 in which the wick raiser or ratchet wheels 22 are arranged. Each of these slots is composed of an upright portion which is formed in the wick tube and a horizontal portion which is formed in the top plate of the cap 20. Oil which escapes from the wick tube through the upright portions of the slots above the cap passes into the drip chamber through the horizontal portions of the slots and escapes from the drip cup through openings 23 in the bottom of the air chamber. The cap or inclosing wall of the drip cup confines this oil and conducts the same to the escape openings 23 through which it returns to the oil pot. The air chamber is permanently secured to the top plate of the oil pot by an oil-tight solder joint; the top plate of the air chamber is permanently secured to the body thereof by solder or otherwise; the wick tube is permanently secured by solder or otherwise to the top and bottom plates of the air chamber; and the drip cup is permanently secured to the wick tube and the bottom of the air chamber. The parts of the air chamber, the wick tube and the drip cup are thus united and form a rigid structure in which the wick tube is permanently united to the top and bottom plates of the air chamber. The burner cone 24 is preferably secured to the globe plate 25 but may be otherwise supported so long as it is separable from the wick tube and air chamber. The raised central portion of the bottom of the air chamber in which the drain openings 23 are formed, locates these openings so high above the level of the oil in the oil pot that no oil can pass upwardly through these openings even if the lantern is inclined to a considerable degree. The air tubes 26 are secured to the air chamber in the usual manner.

I claim as my invention:

1. The combination with an oil pot having a central opening in its top plate, of an air chamber having a bottom provided with an annular portion which is depressed below the top plate of the oil pot and seated in the opening therein, substantially as set forth.

2. The combination with an oil pot having a central opening in its top plate, of an air chamber having a bottom provided with an annular portion which is depressed below the top plate of the oil pot and seated in the opening therein and having a perforated top plate which is permanently secured to the body of the air chamber, and a wick tube permanently secured to the bottom and top plate of the air chamber, substantially as set forth.

3. The combination with an oil pot and an air chamber secured upon the same, and comprising a bottom, a peripheral wall and a top permanently secured together, of a wick tube permanently secured to the bottom of said air chamber, a drip cup surrounding the wick tube above said bottom and secured thereto and to the wick tube, the bottom of the air chamber having an escape opening for oil formed adjacent to the wick tube, and a wick raiser arranged above said drip cup, substantially as set forth.

4. The combination with an oil pot and an air chamber secured upon the same and comprising a bottom, a peripheral wall and a top permanently secured together and having its bottom constructed with a raised central portion which is provided with an opening for the escape of oil, of a wick tube extending upwardly from said raised portion of the bottom and permanently secured thereto, a drip cup surrounding the wick tube above said bottom and secured thereto and to the wick tube, and a wick raiser arranged above said drip cup, substantially as set forth.

5. The combination with an oil pot and an air chamber secured upon the same, of a wick tube secured to the bottom of said air chamber, a drip cup surrounding the wick tube above said bottom, and a wick raiser arranged upon said drip cup, the wick tube being provided with upright slots and the top of the drip cup with connecting horizontal slots in which the wick raiser wheels are arranged, substantially as set forth.

Witness by hand this 30th day of August, 1912.

WARREN McARTHUR, JR.

Witnesses:
R. E. LINDSTROM,
J. LEWIS.